United States Patent [19]
Gowan et al.

[11] Patent Number: 6,142,585
[45] Date of Patent: Nov. 7, 2000

[54] ANTISKID/AUTOBRAKE CONTROL SYSTEM WITH LOW-SPEED BRAKE RELEASE TO REDUCE GEAR WALK

[75] Inventors: John J. Gowan, Mountlake Terrace; Trent D. Miller; Jay S. Kallaher, both of Renton; Thomas T. Griffith, Seattle, all of Wash.

[73] Assignee: The Boeing Company, Seattle, Wash.

[21] Appl. No.: 08/949,415

[22] Filed: Oct. 14, 1997

[51] Int. Cl.$^7$ .................................................. B60T 8/86
[52] U.S. Cl. ........................ 303/126; 303/161; 303/167; 303/DIG. 8
[58] Field of Search .............................. 303/126 DR, 157, 303/167, 177, 191, DIG. 8, 155, 154, 156, 158, 161, 194, 113.1

[56] References Cited

U.S. PATENT DOCUMENTS

| | | |
|---|---|---|
| 2,794,609 | 6/1957 | Perry . |
| 3,630,578 | 12/1971 | Kaiser ..................................... 303/126 |
| 3,771,840 | 11/1973 | Hubbard .................................. 303/159 |
| 3,856,365 | 12/1974 | Steigerwald et al. .................... 303/195 |
| 3,948,569 | 4/1976 | Gentet et al. . |
| 4,006,941 | 2/1977 | DeVlieg . |
| 4,022,513 | 5/1977 | Hirzel et al. ............................ 303/126 |
| 4,053,187 | 10/1977 | Cook . |
| 4,076,331 | 2/1978 | DeVlieg . |
| 4,120,540 | 10/1978 | DeVlieg . |
| 4,125,234 | 11/1978 | Tregre . |

(List continued on next page.)

FOREIGN PATENT DOCUMENTS

| | | |
|---|---|---|
| 0 329 373 | 8/1989 | European Pat. Off. . |
| 0 384 071 | 8/1990 | European Pat. Off. . |
| 0 443 213 | 8/1991 | European Pat. Off. . |
| 555392 | 7/1932 | Germany . |
| 1 756 129 | 2/1970 | Germany . |

*Primary Examiner*—Robert J. Oberleitner
*Assistant Examiner*—Thomas J. Williams
*Attorney, Agent, or Firm*—Christensen O'Connor Johnson Kindness PLLC

[57] ABSTRACT

At low speeds, an antiskid/autobrake control system applies a brake release current to the antiskid valves of the brake system associated with selected wheels of an airplane to prevent brake shudder caused by gear walk. The control system obtains a measured wheelspeed value from each of the selected wheels and calculates a reference wheelspeed based the measured wheelspeed. Tests are made to determine if the reference wheelspeed is below some predetermined magnitude, e.g., 15 knots, and if the airplane ground speed is below some predetermined magnitude, e.g., 50 knots. If the tests are passed, the value of a low-speed brake release current to be applied to the antiskid valves of the airplane's brake system is determined. In order to prevent an abrupt change in braking, the low-speed brake release value ramps off as the airplane slows to a stop. Releasing some of the brakes results in the pilot increasing pressure on the remaining brakes, thereby eliminating brake shudder due to gear walk. Preferably, the low-speed brake release signal is only generated if a valid wheelspeed value has been detected in a predetermined period of time, e.g., 0.5 seconds. Further, a low-speed brake release current is generated only if the low-speed brake release current is greater than an antiskid control current.

4 Claims, 3 Drawing Sheets

U.S. PATENT DOCUMENTS

| | | |
|---|---|---|
| 4,130,322 | 12/1978 | Cook . |
| 4,135,769 | 1/1979 | Williams et al. . |
| 4,180,223 | 12/1979 | Amberg . |
| 4,198,102 | 4/1980 | DeVlieg . |
| 4,205,735 | 6/1980 | Murray . |
| 4,221,350 | 9/1980 | Moser et al. . |
| 4,260,198 | 4/1981 | Cook . |
| 4,269,455 | 5/1981 | Beck et al. . |
| 4,323,969 | 4/1982 | Skarvada . |
| 4,326,755 | 4/1982 | Fretz, III ................................ 303/176 |
| 4,327,414 | 4/1982 | Klein . |
| 4,338,667 | 7/1982 | Cook et al. . |
| 4,360,239 | 11/1982 | Boehringer . |
| 4,402,478 | 9/1983 | Martin . |
| 4,430,715 | 2/1984 | Gentet et al. . |
| 4,484,281 | 11/1984 | Skarvada . |
| 4,484,282 | 11/1984 | Cook et al. . |
| 4,523,633 | 6/1985 | Furukawa et al. . |
| 4,562,542 | 12/1985 | Skarvada . |
| 4,613,190 | 9/1986 | Johnson . |
| 4,640,475 | 2/1987 | Zoerb . |
| 4,881,784 | 11/1989 | Leepek . |
| 4,923,056 | 5/1990 | Nedelk . |
| 5,172,960 | 12/1992 | Chareire . |
| 5,333,942 | 8/1994 | Peczkowski et al. . |
| 5,417,477 | 5/1995 | Lasbleis . |
| 5,511,863 | 4/1996 | Suh . |
| 5,657,229 | 8/1997 | Naito et al. ............................ 303/112 |
| 5,662,393 | 9/1997 | Kamiya et al. ........................ 303/194 |

ANTISKID/AUTOBRAKE CONTROL SYSTEM WITH LOW-SPEED BRAKE RELEASE TO REDUCE GEAR WALK

FIELD OF THE INVENTION

This invention relates to brake systems and, more particularly, to brake control systems.

BACKGROUND OF THE INVENTION

The brake systems of modern commercial airplanes are hydraulic and include electrically operated brake-metering valves, autobrake shuttle valves, and antiskid valves. The valves are controlled by an antiskid/autobrake control unit that produces and sends control signals to the valves of the brake system in accordance with a software program that receives inputs from various sensors and control sources. Pilot instructions produced by the operation of brake pedals or an autobrake setting control the operation of the brake metering valves and the antiskid valves in a manner designed to decelerate an airplane in a smooth manner. The brake metering valves control brake pressure and the antiskid valves control the release of brake pressure in a manner designed to minimize wheel skidding.

It has been found that some airplanes experience brake shudder at low speeds. Brake shudder is caused by landing gear structure moving fore and aft at a high frequency. This effect, called "gear walk," is a dynamic instability between the landing gear structure and the brakes of the airplane. Gear walk causes the airplane to shudder to the extent that passengers and pilots find it objectionable. In addition to passengers and pilots finding gear walk objectionable, gear walk is also disadvantageous because it causes increased loads on landing gear structure, which may result in premature failure to due to fatigue.

The present invention is directed to modifying a brake system in a manner that substantially reduces gear walk and, thus, the shudder caused by gear walk.

SUMMARY OF THE INVENTION

In accordance with this invention, at low speeds, the control system that controls the operation of a braking system applies a brake release signal to the antiskid valves of the brake system associated with some but not all of the wheels of an airplane. The brake release signal prevents brake shudder caused by gear walk by requiring that greater brake meter pressure be applied to the remaining wheels of the airplane in order to maintain the same deceleration. The increased brake meter pressure attenuates the gear walk of the remaining wheels.

In accordance with further aspects of this invention, the brake control system obtains a measured wheelspeed value for each of the some but not all of the wheels and calculates a reference wheelspeed value based on the measured wheelspeed value. Tests are made to determine if the reference wheelspeed value is below some predetermined magnitude, e.g., 15 knots, and if the airplane ground speed value is below some predetermined magnitude, e.g., 50 knots. If the tests are passed, a low-speed brake release current to be applied to the antiskid valves of the airplane's braking system is determined.

In accordance with further aspects of this invention, in order to prevent an abrupt change in braking, the low-speed brake release current ramps on as the airplane slows to a stop.

In accordance with still further aspects of this invention, a test is made to determine if a valid wheelspeed value has been detected for a predetermined period of time, e.g., 0.5 seconds. If not, the low-speed brake release current is reduced to zero.

In accordance with yet still other aspects of this invention, a test is made to determine if the low-speed brake release current is greater than the antiskid control current, which is derived from another source that does not form part of this invention. If the low-speed brake release current is greater than the antiskid control current, the low-speed release current is applied to the antiskid valves of the brake system. If the low-speed release current is not greater than the antiskid control current, the antiskid control current is applied to the antiskid valves of the brake system.

As will be readily appreciated from the foregoing description, the invention attenuates the shudder caused by gear walk in a relatively uncomplicated manner. Releasing some of the brakes at low speeds makes it necessary for greater brake pressure to be applied to the remaining brakes in order to maintain the same deceleration. The increased brake metered pressure on the remaining brakes attenuates the gear walk of the landing gear.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
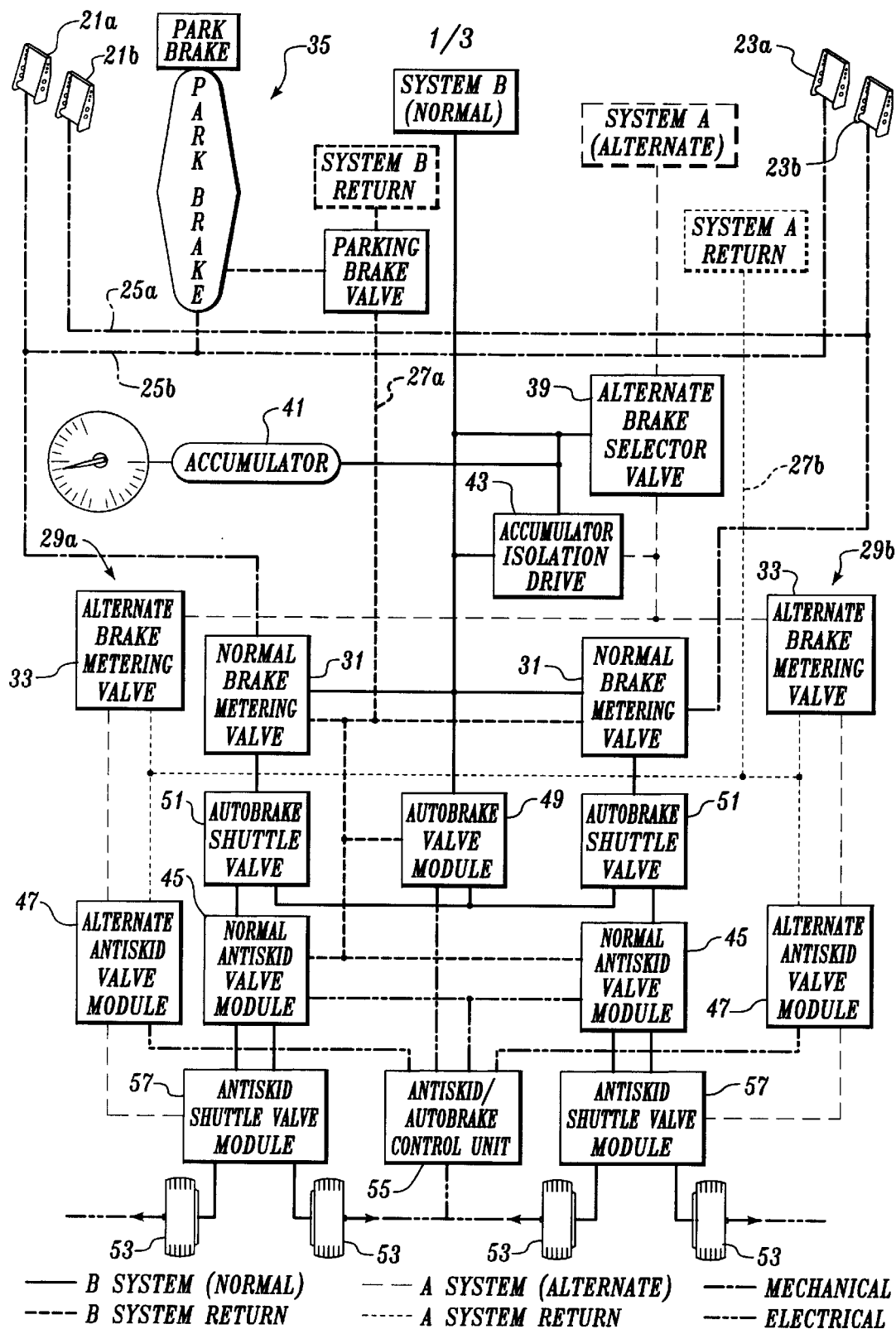
FIG. 1 is a block diagram of an exemplary airplane brake system.

FIG. 1 is a block diagram of a brake system for a contemporary commercial airplane such as the Boeing 737. In order to provide full and differential braking capability, the brake system includes two sets of brake pedals. The captain's brake pedals 21a and 21b are connected to the first officer's brake pedals 23a and 23b by a bus bar and connecting linkage 25a and 25b. Cables 27a and 27b, located on the left and right sides of the airplane, connect the pedals 21 a, 21 b, 23a and 23b to brake-metering valve modules 29a and 29b located in each wheelwell. Each brake-metering module includes a normal brake-metering valve 31 and an alternate brake-metering valve 33. The normal brake-metering valves 31 form part of a normal brake system and the alternate brake-metering valves 33 form part of an alternate brake system. The normal brake system is used under normal conditions and the alternate brake system is used when the normal brake system fails. A parking brake lever 35 latches the brakes on when both brake pedals are fully depressed by either the captain or the first officer.

The normal brake system is powered by a normal hydraulic system designated system B. The alternate brake system is powered by an alternate hydraulic system designated system A. The alternate brake system is automatically selected by an automatic brake selector valve 39 when hydraulic power is lost by the normal hydraulic system, i.e., system B. An accumulator 41 in the normal brake system is automatically selected when both normal and alternate brake hydraulic power is lost. An accumulator isolation valve 43 isolates the accumulator 41 from the remainder of the system.

The normal and alternate brake-metering valves 31 and 33 control the amount of hydraulic system pressure applied to normal or alternate antiskid valve modules 45 and 47, respectively. Located between the normal brake metering valves 31 and the normal antiskid valve modules 45 on the right and left sides of the airplane are autobrake shuttle valves 51. The autobrake shuttle valves 51 are controlled by an autobrake valve module 49, which, in turn, is controlled by an antiskid/antibrake control unit 55. The normal antiskid valve modules 45 receive either normal brake metered pressure from the normal brake metering valves 31 or autobrake pressure from the autobrake valve module 49 and regulate the pressure applied by the brakes of the airplane wheels 53. The alternate antiskid valve modules 47 receive alternate brake pressure from the alternate brake metering valves 33 and regulate pressure to the brakes when, as noted above, the normal brake system fails.

An antiskid/autobrake control unit 55 sends electrical control signals to the antiskid valve modules 45 and the alternate antiskid valve modules 47 to control braking under skid conditions. The antiskid/autobrake control unit also sends electrical control signals to the autobrake valve module that causes brake pressure to be metered in a manner that maintains a preset deceleration. Wheelspeed transducers mounted in the axles of the wheels 53 produce the wheelspeed signals that are used by the software of the antiskid/autobrake control unit 55 to create the desired electrical control signals.

The antiskid system controls braking pressure in a manner that achieves maximum effectiveness in both automatic and manual brake operations under all runway conditions. In essence, the control signals release the brakes when a wheel skid is detected in order to reduce skidding. The antiskid/autobrake control unit receives input from a transducer associated with each of the four wheels shown in FIG. 1. The antiskid/autobrake control unit 55 uses these inputs to control the amount of brake pressure applied by the normal and alternate antiskid valve modules to the wheels via the antiskid shuttle valve modules 57. The antiskid system allows maximum braking without locking the wheels and provides hydroplane and touchdown protection.

The autobrake system provides automatic braking control by applying hydraulic brake pressure on landing or upon initiation of a refuse takeoff (RTO). The system operates with the normal antiskid system and at least one inertial reference system—normally the Airplane Data Inertial Reference Unit (ADIRU). The ADIRU is independent of the antiskid/autobrake control unit. The ADIRU uses accelerometers to determine airplane ground speed. The autobrake system brings an airplane to a complete stop unless it is disarmed by the pilot.

An autobrake selector switch (not shown) has five landing settings. Deceleration can be changed during roll-out. The autobrake system regulates brake pressure to control the overall deceleration of the airplane. The amount of brake pressure commanded will vary, depending upon decelerating forces. When the RTO position is selected before takeoff, maximum braking system pressure is applied to all wheels if both thrust levers are moved to idle during a takeoff roll.

In some airplanes, during normal takeoff, the autobrake selector switch returns to an off position at lift-off. In other airplanes the autobrake selector switch does not return to an off position at lift-off.

Figure 2:
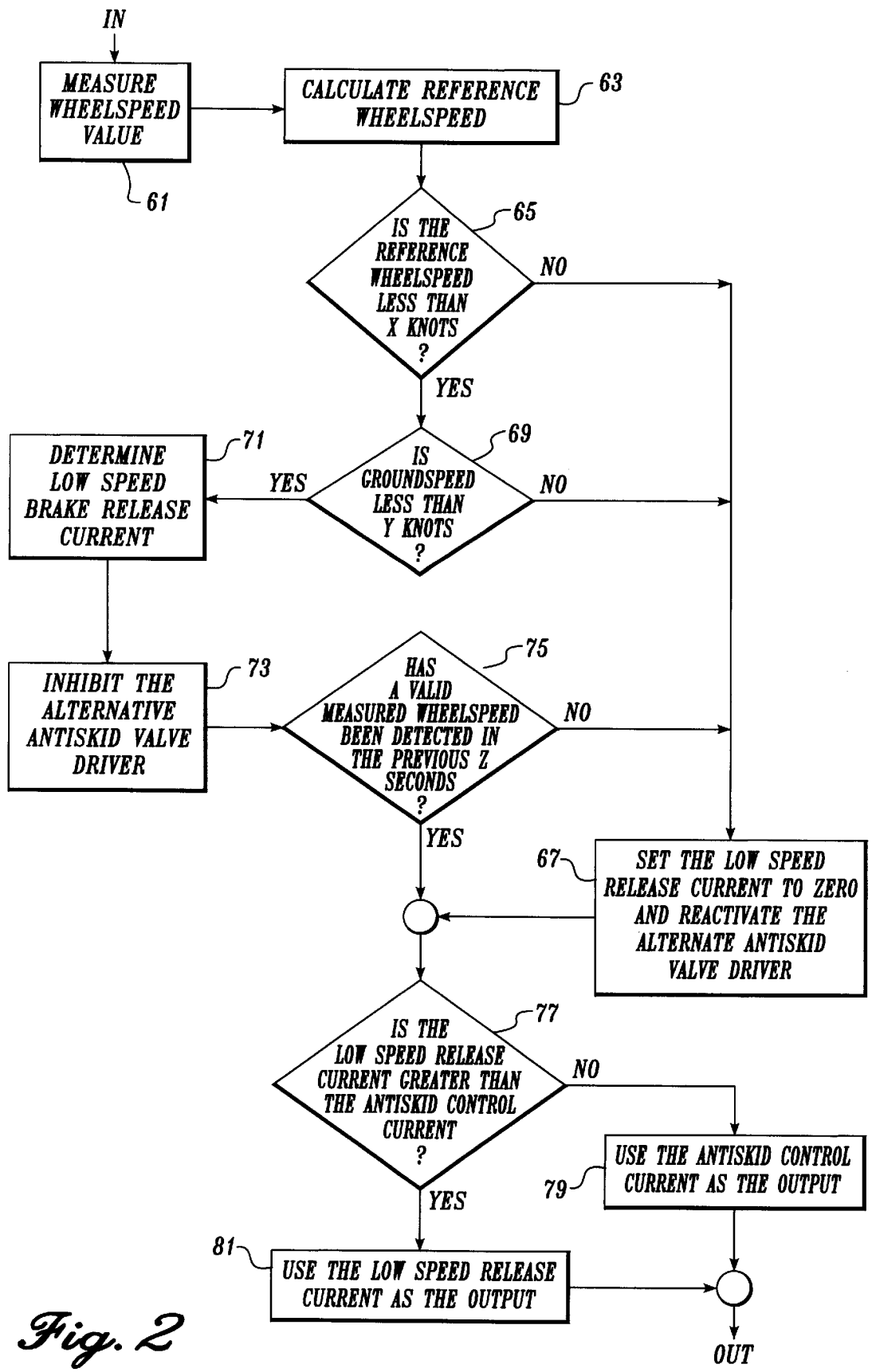
FIG. 2 is a functional block diagram of brake system software formed in accordance with the invention in a manner for attenuating gear walk.

It has been found that some brake systems of the type illustrated in FIG. 1 can experience brake shudder when an airplane comes to a stop. Shudder is caused by landing gear structure moving fore and aft at a high frequency. This effect is commonly referred to as "gear walk." As will be better understood from the following discussion, it has been found that releasing some of the brakes at low speed (e.g., two of the four brakes illustrated in FIG. 1) will significantly reduce gear walk. The present invention accomplishes this result by modifying the software that operates the antiskid/autobrake control unit. FIG. 2 illustrates the software modification.

FIG. 2 is a block diagram illustrating the software modification for each of the brakes to be released. The software that controls the unreleased brakes is not modified.

As shown in FIG. 2, the first step of the modification is to measure the wheelspeed value for the related wheel. This is accomplished by reading the output of the related wheelspeed transducer previously described in connection with FIG. 1. See block 61. Next, at block 63, a reference wheelspeed valve is calculated based on the measured wheelspeed. Reference wheelspeed is the speed of an unbraked wheel and is calculated using a well-known algorithm. Next a test is made to determine if the reference wheelspeed value is less than a predetermined (X) numbers of knots. See block 65. In one actual embodiment of the invention, X was chosen to be 15 knots. If the reference wheelspeed is not less than X knots, the program cycles to block 67, where the low-speed release current is set to zero and the alternate antiskid valve driver is reactivated. The alternate antiskid valve driver operates the alternate antiskid valve modules 47, illustrated in FIG. 1 and previously described, in the event the normal brake system fails.

If the measured wheelspeed is less than X knots, a test is made to determine if the ground speed of the airplane determined by the inertial reference system of the airplane, e.g., the ADIRU, is less than Y knots. See block 69. In one actual embodiment of the invention, Y was chosen to be 50 knots. If the calculated wheelspeed is not less than Y knots, the program cycles to block 67 where, as noted above, the low speed release current is set to zero and the alternate antiskid valve driver is reactivated.

Figure 3:
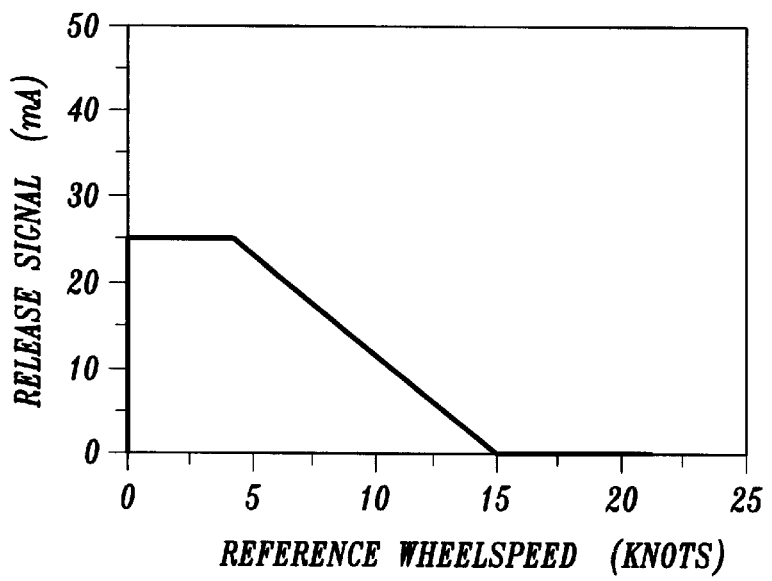
FIG. 3 is a release signal versus reference wheelspeed diagram depicting the ramp off low-speed brake release current in accordance with this invention.

If the calculated wheel speed is less than Y knots, the low-speed brake release current is determined. The low-speed brake release current is determined by reading a look-up table that matches the graph illustrated in FIG. 3. More specifically, FIG. 3 is a graph of release signal current versus reference wheelspeed. The release signal current falls between 0 to 25 milliamps (mA) in the example illustrated in FIG. 3. At a reference wheelspeed of 15 knots and above, the release signal is zero. As a result, no low-speed brake release current is produced. At wheelspeed between 15 and 5 knots, the current ramps from 0 to a maximum value of 25 mA. At wheelspeed between 0 and 5 knots, the release signal is at the maximum value, i.e., 25 mA. The low-speed brake release current ramps in the manner illustrated in FIG. 3 in order to prevent an abrupt change in airplane deceleration when a brake is released.

As noted above, preferably, the graph illustrated in FIG. 3 is stored as a table in the memory of the antiskid/autobrake control unit and is used in combination with a suitable interpolation algorithm to determine low-speed brake release current based on reference wheelspeed value.

Returning to FIG. 2, after the low-speed brake release current has been determined, the alternate antiskid valve driver is inhibited. See block 73. Thereafter, a test is made to determine if a valid wheelspeed value has been detected in the previous Z number of seconds. See block 75. In one actual embodiment of the invention, Z is set equal to one-half second. If a valid wheel speed has not been detected in the previous Z seconds, the program cycles to block 67, wherein the low-speed release current is set to zero and the alternate antiskid valve driver is reactivated.

If a valid wheelspeed value has been detected in the previous Z seconds or after the low-speed release current is set to zero and the alternate antiskid valve driver is reactivated, the logic paths come together and a test is made to determine if the low-speed release current is greater than the antiskid control current. See block 77. The antiskid control current is determined by antiskid logic that does not form part of this invention. If the low-speed release current is not greater than the antiskid control current, the antiskid control current forms the output. See block 79. If the low-speed release current is greater than the antiskid control current, the low-speed release current forms the output. See block 81.

Figure 4:
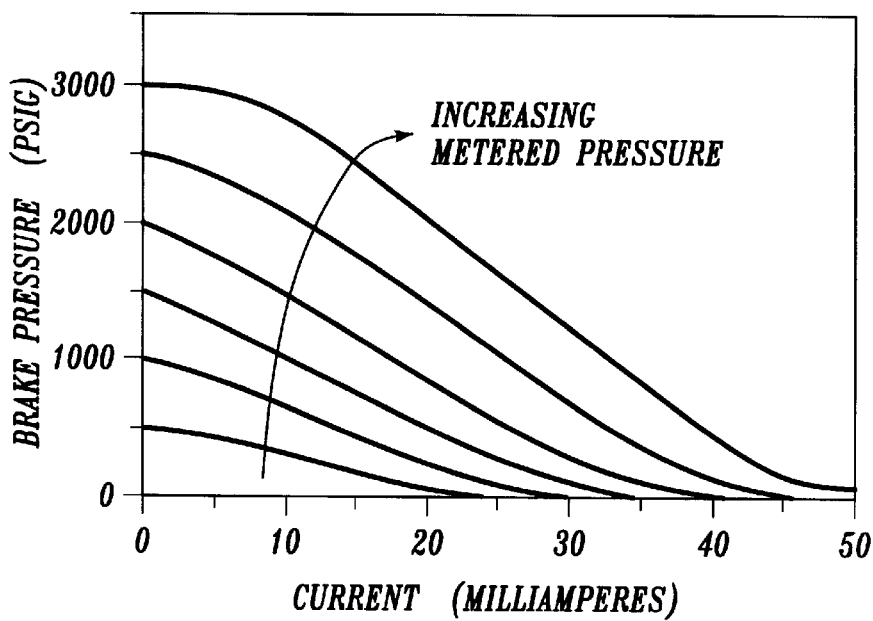
FIG. 4 is a brake pressure versus current diagram for a multigain antiskid valve.

In the actual embodiment of the invention depicted by the FIG. 3 graph, the maximum low-speed brake release signal current was set at 25 milliamps because this takes advantage of multigain antiskid valve characteristics included in the brakes of the related aircraft—the Boeing 737–700. The multigain antiskid valve pressure versus current relationship is shown in FIG. 4. At low metered pressures (less than 1,000 psi) where gear walk occurs, the 25 mA signal is sufficient to fully release a brake. In contrast, if a pilot meters 3,000 psi in a panic stop situation, a greater amount of pressure, e.g., 1,200 psi, will be applied to the brakes.

As illustrated in FIG. 2 and described above, when a suitably high low-speed brake release current is to be produced, the alternate antiskid valve drivers are inhibited. This prevents the low-speed release signal from affecting the alternate brake system. Instead of releasing only two of the four brakes on the airplane, the low-speed brake release current would cause all four brakes to be released if the alternate system were in operation. To prevent this, the alternate antiskid system is "turned off" by inhibiting the alternate antiskid valve drivers when a low-speed brake release current of suitable magnitude is to be produced.

As also noted above and illustrated in FIG. 2, the low-speed brake release current is compared with an antiskid control current calculated by other software not illustrated in FIG. 2 and which does not form part of this invention. Whichever signal is greater is supplied to the antiskid valve. This allows the antiskid control algorithm to override the low-speed brake release current if a tire is skidding.

As will be readily appreciated from the foregoing description, the invention provides a brake control system that reduces gear walk by releasing some of the brakes of an airplane during deceleration. Because gear walk is reduced, airplane shudder is reduced. As a result, passenger and pilot comfort is increased. In addition, the potential for structural fatigue is reduced.

While the preferred embodiment of the invention has been illustrated and described, it will be appreciated that within the scope of the appended claims, various changes can be made therein without departing from the spirit of the invention.

The embodiments of the invention in which an exclusive property or privilege is claimed are defined as follows:

1. In an antiskid/autobrake control unit for controlling the application of brake pressure to the brakes of an airplane for decelerating the airplane, said antiskid/autobrake control unit controlled by software, the improvement comprising modifying said software so that some but not all of the brakes of said airplane are released at low speed in order to reduce brake shudder, said software controlling the production of a low-speed brake release current, said low-speed brake release current being applied to the antiskid valves of said some but not all of the brakes of said airplane. said software determining if the speed of the related wheel is less than a first predetermined number of knots and setting the low-speed brake release current to zero if the wheel speed is not less than the first predetermined number of knots, said software determining if the ground speed of the airplane is less than a second predetermined number of knots and setting the low-speed brake release current to zero if the calculated wheelspeed value is less than the second predetermined number of knots.

2. The improvement claimed in claim 1, wherein the software determines a low-speed brake release current if the speed of the related wheel is less than said first predetermined number of knots and if the ground speed of the airplane is less than said second predetermined number of knots.

3. The improvement claimed in claim 2, wherein the software determines if a valid wheelspeed value has been detected in a previous number of seconds and sets the low-speed brake release current to zero if a valid wheelspeed value has not been detected within a predetermined number of seconds.

4. The improvement claimed in claim 3, wherein the software determines if the low-speed brake release current is greater than an antiskid control current and applies the low-speed brake release current to the antiskid valves of said some but not all of the brakes of said airplane if the low-speed brake release current is greater than the antiskid control current and does not apply the low-speed brake release current to the antiskid valves to said some but not all of the brakes of said airplane if the low-speed brake release current is not greater than the antiskid control current.

* * * * *

UNITED STATES PATENT AND TRADEMARK OFFICE
CERTIFICATE OF CORRECTION

PATENT NO. : 6,142,585
DATED : November 7, 2000
INVENTOR(S) : J.J. Gowan et al.

Page 1 of 1

It is certified that error appears in the above-identified patent and that said Letters Patent is hereby corrected as shown below:

<u>Title page,</u>
Item [57], ABSTRACT, line 7, "based the measured" should read -- based on the measured --

<u>Column 6,</u>
Line 22, "brakes of said airplane. said" should read -- brakes of said airplane, said --

Signed and Sealed this

Seventh Day of May, 2002

Attest:

Attesting Officer

JAMES E. ROGAN
Director of the United States Patent and Trademark Office